US012196493B2

(12) United States Patent
Chen et al.

(10) Patent No.: US 12,196,493 B2
(45) Date of Patent: Jan. 14, 2025

(54) LAYOUT OF SLAB STOREROOMS AND FURNACES FOR SEPARATE CHARGING OF COLD BLANKS AND HOT BLANKS OF THICK PLATE, AND FURNACE CHARGING METHOD

(71) Applicant: BAOSTEEL ZHANJIANG IRON & STEEL CO., LTD., Zhanjiang (CN)

(72) Inventors: Guofeng Chen, Zhanjiang (CN); Bin Liu, Zhanjiang (CN)

(73) Assignee: BAOSTEEL ZHANJIANG IRON & STEEL CO., LTD., Zhanjiang (CN)

( * ) Notice: Subject to any disclaimer, the term of this patent is extended or adjusted under 35 U.S.C. 154(b) by 384 days.

(21) Appl. No.: 17/763,891

(22) PCT Filed: Sep. 29, 2020

(86) PCT No.: PCT/CN2020/118934
§ 371 (c)(1),
(2) Date: Mar. 25, 2022

(87) PCT Pub. No.: WO2021/063365
PCT Pub. Date: Apr. 8, 2021

(65) Prior Publication Data
US 2022/0316801 A1 Oct. 6, 2022

(30) Foreign Application Priority Data
Sep. 30, 2019 (CN) ......................... 201910944706.6

(51) Int. Cl.
*C21D 9/00* (2006.01)
*F27D 3/00* (2006.01)

(52) U.S. Cl.
CPC ............. *F27D 3/00* (2013.01); *C21D 9/0018* (2013.01); *C21D 9/0081* (2013.01); *F27D 2003/0042* (2013.01)

(58) Field of Classification Search
CPC ...... F27D 3/00; F27D 2003/0042; F27B 3/04; F27B 3/045; C21D 9/0018; C21D 11/00
See application file for complete search history.

(56) References Cited

U.S. PATENT DOCUMENTS 4,586,897 A * 5/1986 Weber ....................... F27B 9/38 432/208
5,533,248 A 7/1996 Tippins et al.

FOREIGN PATENT DOCUMENTS

CN 104034172 A 9/2014
CN 104624660 A 5/2015
(Continued)

OTHER PUBLICATIONS

JP Office Action dated Mar. 10, 2023 for JP App No. 2022-518369.
(Continued)

*Primary Examiner* — Gregory A Wilson
(74) *Attorney, Agent, or Firm* — Lei Fang, Esq.; Smith Tempel Blaha LLC

(57) ABSTRACT

A slab library for separate storage of cold blanks and hot blanks of heavy plates and heating furnace layout, and a furnace loading method are provided. The slab library and heating furnace layout comprises: 1 # slab library and 2 # slab library span, arranged side by side; continuous casting blank delivery roller way connected to the continuous casting process; heating furnace span arranged at the outlet of the 2 # slab library span; slab preparatory library span, which is across the inlets of the 1 # slab library span and the 2 # slab library span; span-crossing traverse trolley roller way and the heating furnace span; span-crossing Horary-spa roller way and the 1 # slab library span; and, feeding roller way and the heating furnace span, and across the hot blank zone and the cold blank zone of the 2 # slab library span and the two ends of the heating furnace span.

4 Claims, 4 Drawing Sheets

(56) References Cited

FOREIGN PATENT DOCUMENTS

| | | | | |
|---|---|---|---|---|
| CN | 108927412 | A | 12/2018 | |
| EP | 0726101 | A1 * | 8/1996 | |
| JP | H10-34222 | A | 2/1998 | |
| JP | 2013126673 | A | 6/2013 | |
| JP | 2017170462 | A | 9/2017 | |
| JP | 20160078070 | A | 10/2017 | |
| WO | WO-9612572 | A1 * | 5/1996 | ............. B21B 1/466 |

OTHER PUBLICATIONS

International Search Report for PCT/CN2020/118934 dated Dec. 10, 2020.

International Written Opinion for PCT/CN2020/118934 dated Dec. 10, 2020.

Liu, Yang, Search and Application of Management Optimization of Slabstorage and Discharge Oriented Integrated Production, China Master's Theses Full-text Database, Economics and Management Science, No. 02, Feb. 15, 2018, ISSN: 1674-0246, pp. 7-10.

JP 2nd Office Action dated Jun. 30, 2023 for JP App No. 2022-518369.

* cited by examiner

LAYOUT OF SLAB STOREROOMS AND FURNACES FOR SEPARATE CHARGING OF COLD BLANKS AND HOT BLANKS OF THICK PLATE, AND FURNACE CHARGING METHOD

CROSS-REFERENCE TO RELATED APPLICATIONS

This application is a 371 U.S. National Phase of PCT International Application No. PCT/CN2020/118934 filed on Sep. 29, 2020, which claims benefit and priority to Chinese patent application No. CN 201910944706.6 filed on Sep. 30, 2019, the content of both are incorporated by reference herein in their entireties.

TECHNICAL FIELD

The present invention pertains to the technical field of rolling steel and relates to a slab library for separate storage of cold blanks and hot blanks of heavy plates and heating furnace layout and a furnace loading method.

BACKGROUND ART

Generally, a slab library of heavy plates is located downstream of a steelmaking and continuous casting process. The slab library mainly has two functions. One function is as a buffering zone between the continuous casting process and the heating and rolling process for heavy plates, to temporarily store the blanks. In general, the capacity of a continuous casting machine is greater than that of heating and rolling heavy plates. When the heating and rolling process cannot be timely conducted, the excess blanks need to be temporarily stored in an offline slab library. Furthermore, in many cases, due to the factors such as delivery date, group board, process, quality or even state, the blanks cannot be considered as a part of the planned heating and rolling process, and this portion also needs to be fed to the offline slab library.

The other function is, according to the planned process, to organize the plate blanks to be stacked and stored in order and fed to a heating furnace. To make it easy to manage the plate blanks and feed the materials in the next step, the plate blanks are supposed to be stacked according to a certain property. When the blanks of different properties are stacked together, it is difficult to match the planned heating and rolling process, and there can be a large workload of reposition and restorage of slabs (hanging down the blanks on the top of the stack to find the desired blanks according to the planned process), thus causing low working efficiency.

The heating furnace is located downstream of the slab library to heat the desired plate blanks to the target temperature for specified time duration, so as to provide raw materials for rolling operation. Generally, to improve working efficiency of the slab library, the order of blank feeding is not necessarily strict, and can be adjusted within a certain range of plate blanks. In general, one heating furnace for heavy plates can be loaded with steel materials in one row or two rows. In a routine production, when the blanks exit the outlet of the heating furnace, the blanks can be loaded through the inlet of the heating furnace.

The slab library is consisted of several parallel spans (library zones). Raw materials for steelmaking are delivered to the slab library span through a roller way, and cross-over preparation is made by a trolley going through the spans according to the production plan. The plate blanks are lined up in order at one end of the feeding roller of the heating furnace to wait for feeding. When the steel materials exit from the corresponding heating furnace, the blanks waiting along the roller way can be loaded.

The temperature of the blanks exiting from the continuous casting machine is about 900° C. If the process is not delayed, generally, the temperature of the blanks feeding to the slab library of heavy plate can reach no lower than 600° C. If the blanks need to be rolled off and fed to the slab library for stacking and storing, the temperature of the blanks will continuously decrease. If the temperature of the plate blanks is lower than 100° C., the blanks are called as cold blanks, while if the temperature of the plate blanks is higher than 400° C., the blanks are called as hot blanks, and if the temperature of the plate blanks is within another temperature range, the blanks are called as warm blanks. Using the hot blanks for steel loading and heating, it can increase the temperature of the blanks at the time of loading to the furnace, save fuel, shorten heating time duration, and significantly reduce costs.

The prior art has the following problems:

1. Problems in Slab Library and Furnace Layout
   - (1) When the blanks for steelmaking enter into the slab library and prepare for a heavy plate process, it is difficult to perform pre-sortation according to hot and cold blanks or the production plan, thus causing difficulty for later preparing.
   - (2) The cross-over transfer and preparation is made mainly by a trolley going through the spans, wherein the blanks need to be re-stacked/hang on/unloaded, etc (many steps), thus affecting the process efficiency.
   - (3) The plate blanks have to be lined up in order in only one direction along the feeding roller way to the heating furnace, waiting for feeding. The feeding efficiency is low, and the hot and cold blanks cannot be sorted to be fed to different heating furnaces.
2. Problems in Furnace Loading Manner There is a communicated cavity structure in the interior of the heating furnace, wherein a mixture of fuel and air passes through the nozzle to be burned within the furnace, so as to heat the blanks. Due to such a structure, the thermal flow field of each part in the heating furnace is integrally connected and cannot impart "individual" heating to blanks within a very small range. If the cold blanks and hot blanks are mixed, to achieve the requirement on the heating process, the heating furnace has to "compromise" for the cold blanks so as to use more fuel and longer heating time. Therefore, generally, for energy conservation and environment protection and improved production efficiency, efforts have been made to avoid mixing or "mingling" hot and cold blanks in one heating furnace.

In the common slab library and furnace layout, the roller way for loading extends from the first heating furnace to the last row of the last heating furnace, and there is only one stream direction for loading. In actual production, there are always part of the blanks being loaded as hot blanks and part loaded as cold blanks. If one heating furnace is designated to load the hot blanks only, while another to load the cold blanks only, the hot and cold blanks have to be arranged on the roller way for loading in an alternate way. When one heating furnace is loaded with steel, since the neighboring blanks are at different temperature states, the blanks along the roller way cannot get position-adjusted and filled in as needed. They must wait for the completion of loading of the neighboring blanks at different temperature states, and then the subsequent blanks can be moved forward along the roller way to fill in the corresponding loading position.

Such a loading manner has the following problems:

(1) Since there is always time lag for adjusting and filling in, if the speed of the rolling line is high and the frequency of drawing steel is high, the speed of loading cannot match the speed of drawing steel, thus forming partly empty furnace, which wastes energy source and lowers rolling frequency.

(2) If there is too long time lag for loading the blanks, the waited blanks will occupy the loading roller way, so the moving trolley cannot continuously hang the subsequent blanks on the loading roller way, while the working speed of the moving trolley is slow, thus generally causing a mismatch in the feeding speed.

(3) Since the hot and cold blanks are always placed on the feeding roller way alternately, and sometimes due to the requirement on rolling process or other requirement, drawing steel may not be performed according to the lining up order for rows of the heating furnace in a short time, and it is difficult for the later blanks to be loaded smoothly.

(4) Since the feeding always requires that the hot and cold blanks be fed in an alternate way strictly in order, it is often to add working load for moving trolley and stacking, reduce working efficiency, and affect feeding speed. And, the order for placing the hot and cold blanks in an alternate way is error-prone, and even if the error is corrected, the efficiency for loading steel is affected, and the energy source is wasted.

SUMMARY

The objectives of the present invention is to provide a slab library for separate storage of cold blanks and hot blanks of heavy plates and heating furnace layout and a furnace loading method, which can achieve the separate storage and stacking, feeding and heating of the cold blanks and hot blanks, and can not only save energy and protect environment, but also solve the problems that the feeding in an alternate way is slow in frequency, low in efficiency and error-prone.

To achieve the above objectives, the present invention provides the following technical solutions:

A slab library for separate storage of cold blanks and hot blanks of heavy plates and heating furnace layout, characterized in comprising:

1 # slab library span for storing the blanks which need to be stored for a long time, or cold blanks; 2 # slab library span, i.e. feeding span, arranged side by side on one side of the 1 # slab library span, for stacking hot blanks which need to be temporarily stacked for a short time (i.e. hot blanks to be fed), or for storing cold blanks to be fed, wherein a continuous casting blank delivery roller way connected to the continuous casting process is arranged at the inlet of the 2 # slab library span; and, the cold blank zone and the hot blank zone are respectively arranged within the 1 # slab library span and the 2 # slab library span;

heating the furnace span arranged at the outlet of the 2 # slab library span, wherein more than two heating furnaces are arranged in the heating furnace span, and arranged side by side at the outlet of the 2 # slab library span, corresponding to the hot blank zone and the cold blank zone;

slab preparatory library span, which is across the inlets of the 1 # slab library span and the 2 # slab library span, i.e. a hot blank zone, wherein the continuous casting blank delivery roller way passes through the slab preparatory library span;

span-crossing traverse trolley roller way, which is across the cold blank zones of the 1 # slab library span and the 2 # slab library span, and the heating furnace span;

span-crossing roller way, which is across the slab preparatory library span and the 1 # slab library span, for delivering the blanks from the slab preparatory library span or the blanks from the continuous casting blank delivery roller way to the 1 # slab library span; and feeding roller way, arranged between the 2 # slab library span and the heating furnace span, and across the hot blank zone and the cold blank zone of the 2 # slab library span and the two ends of the heating furnace span, wherein the feeding roller way has a structure for delivery in two directions.

According to one example of the invention, a furnace loading method uses the slab library for separate storage of cold blanks and hot blanks of heavy plates and heating furnace layout according to claim 1, comprising the following steps:

1) determining the ratio x of hot blanks in the blanks to be fed in a planned heating and rolling process;

2) according to the ratio of hot blanks and the number of the heating furnaces (the total number of the heating furnaces is N, the number of the selected hot blank heating furnaces is i, and the hot blank heating furnace ratio is y=i/N; setting the initial value of i as 1, and calculating the hot blank heating furnace ratio y, wherein if the value of y is greater than the ratio x, then i−1 of the heating furnaces are selected as the hot blank heating furnaces, and N−i+1 of the heating furnaces are selected as the cold blank heating furnaces; and if i<1, then the number of the hot blank heating furnace is 1, and the number of the cold blank heating furnaces is N−1; and 3) setting heating furnaces No. 1 to No. i−1 as a feeding roller zone for hot blanks, and heating furnaces No. N to No. N−i+1 as a feeding roller zone for cold blanks, feeding hot blanks from the roller way at the end of the $1^{st}$ heating furnace, and feeding cold blanks from the roller way at the end of the $N^{th}$ heating furnace.

According to one example of the invention, the total number of the heating furnaces N=3, and the ratio of hot blanks is 70%, wherein the number of hot blank heating furnaces is 2, and the number of cold blank heating furnaces is 1.

According to one example of the invention, the total number of the heating furnaces N=4, and the ratio of hot blanks is 20%, wherein the number of hot blank heating furnaces is 1, and the number of cold blank heating furnaces is 3.

In the slab library and furnace layout of the invention:

The 1 # slab library span is used to store blanks which need to be stored for a long time, or cold blanks, etc.

The 2 # slab library span, i.e. feeding span, is used to stack hot blanks which need to be temporarily stacked for a short time and to be fed, and to additionally store cold blanks to be fed.

The slab preparatory library span is a traverse slab library span arranged between the slab library span for heavy plates and the continuous casting blank delivery roller way, for pre-sorting the blanks entering into the heavy plate process according to the production plan or the properties of the hot and cold blanks, and can also be used as a buffering zone for temporarily storing the blanks which need to be temporarily rolled off from the continuous casting blank delivery roller way.

The continuous casting blank delivery roller way is used to convey the blanks from the continuous casting process to a heavy plate plant, wherein the roller way passes through the slab preparatory library span and the 2 # slab library span, and the conveyed blanks can be rolled off, or directly hang onto the feeding roller way or the span-crossing roller way.

The span-crossing roller way is used to deliver the blanks from the slab preparatory library span or the blanks from the continuous casting blank delivery roller way to the 1 # slab library span.

The feeding roller way is used to finish the feeding of all of the blanks to the heating furnace. The roller has two main features: one is that the roller way extends from two ends of the heating furnace zones, to provide positions for feeding preparation; and the other is that the feeding roller way can deliver blanks in two directions, i.e. hot blacks from one end, and cold blanks from the other end, thus, the hot blanks and the cold blanks can be continuously arranged in the feeding roller way, waiting for feeding. In this way, the layout of the invention can not only meet the requirement that hot blanks and cold blanks are loaded separately, but also avoid any problem caused by feeding hot blanks and cold blanks in an alternate way.

The heating furnace span is provided with more than two heating furnaces, wherein part of the heating furnaces are specifically used for hot blanks, and the rest for cold blanks, so as to meet the requirement on separate storage of hot blanks and cold blanks.

The raw materials for steelmaking can be pre-sorted and diverted in the slab preparatory library span, which can quickly feed the blanks which need to be fed to the furnace or hot blanks to the preparatory library span, and feed the blanks which need to be stored for a long time to other zones.

The feeding roller way of the heating furnace has the function of feeding on both ends simultaneously, wherein the feeding of each heating furnace can be arbitrarily performed on one end of the feeding roller way.

Beneficial Effects

The slab library and furnace layout and the furnace loading method of the present invention can achieve the separate storage and stacking, feeding and heating of cold blanks and hot blanks.

The inventive method can not only save energy and protect environment, but also solve the problems that the feeding in an alternate way is slow in frequency, low in efficiency and error-prone.

BRIEF DESCRIPTION OF THE DRAWINGS

These and other features, properties and advantages of the present invention will become more apparent when the following detailed description of the disclosure is read with reference to the accompanying drawings and examples, and the same reference signs in the drawings always refer to the same features, in which.

DETAILED DESCRIPTION

Now, the invention is further illustrated with reference to the examples and the accompanying drawings.

Figure 1:
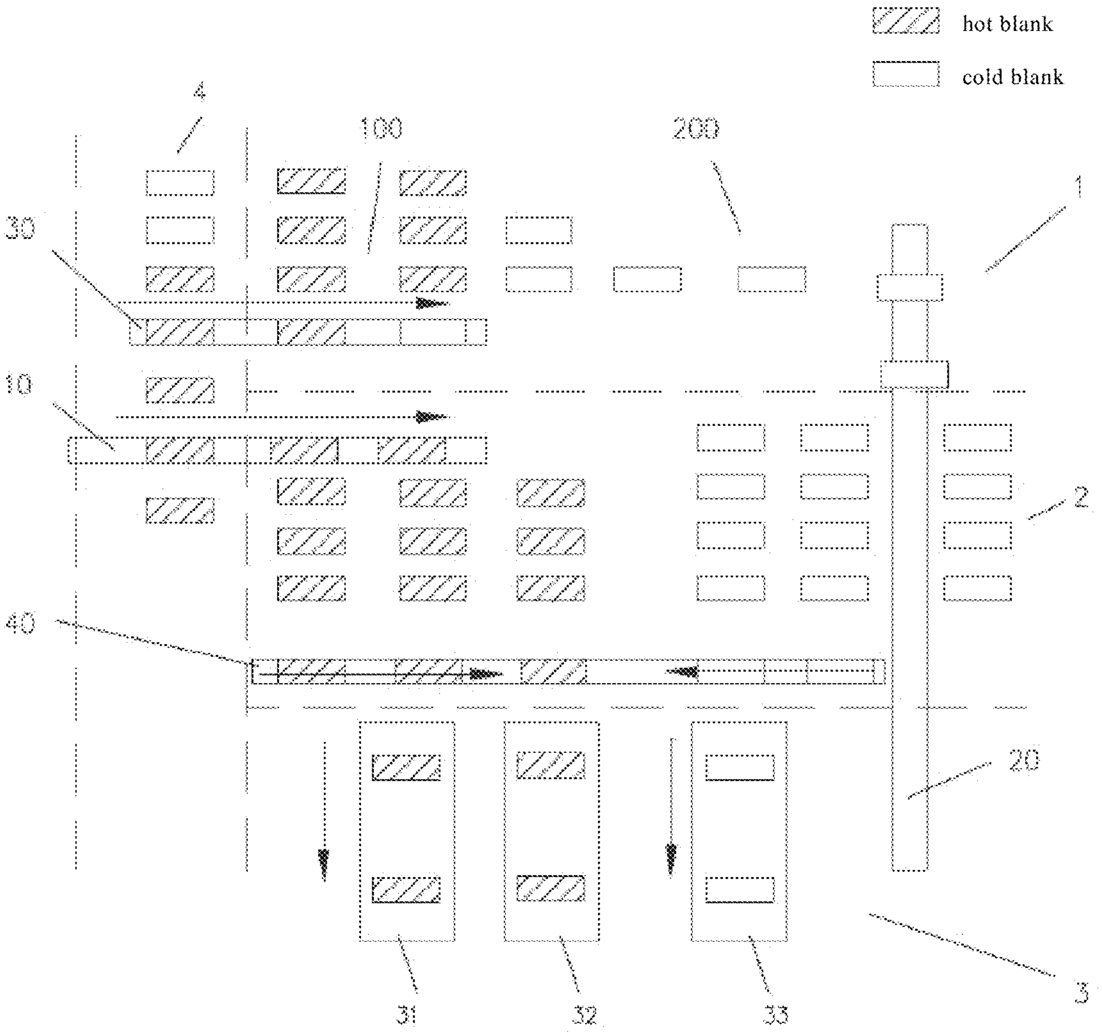
FIG. 1 is a schematic view of the slab library for separate storage for cold blanks and hot blanks of heavy plates and heating furnace layout according to the present invention.

Referring to FIG. 1, the slab library for separate storage for cold blanks and hot blanks of heavy plates and heating furnace layout of the invention comprises:

1 # slab library span 1 for storing the blanks which need to be stored for a long time, or cold blanks;

2 # slab library span 2, i.e. feeding span, arranged side by side on one side of the 1 # slab library span 1, for stacking hot blanks which need to be temporarily stacked for a short time (i.e. hot blanks to be fed), or for storing cold blanks to be fed, wherein a continuous casting blank delivery roller way 10 connected to the continuous casting process is arranged at the inlet of the 2 # slab library span 2; and, the hot blank zone 100 and the cold blank zone 200 are respectively arranged within the 1 # slab library span 1 and the 2 # slab library span 2;

heating the furnace span 3 arranged at the outlet of the 2 # slab library span 2, wherein more than two heating furnaces 31, 32, 33 are arranged in the heating furnace span 3, and arranged side by side at the outlet of the 2 # slab library span 2, corresponding to the hot blank zone 100 and the cold blank zone 200;

slab preparatory library span 4, which is across the inlets of the 1 # slab library span 1 and the 2 # slab library span 2, i.e. a hot blank zone 100, wherein the continuous casting blank delivery roller way 10 passes through the slab preparatory library span 4;

span-crossing traverse trolley roller way 20, which is across the cold blank zones 200 of the 1 # slab library span 1 and the 2 # slab library span 2, and the heating furnace span 3;

span-crossing roller way 30, which is across the slab preparatory library span 4 and the 1 # slab library span 1, for delivering the blanks from the slab preparatory library span 4 or the blanks from the continuous casting blank delivery roller 30 to the 1 # slab library span 1; and feeding roller way 40, arranged between the 2 # slab library span 2 and the heating furnace span 3, and across the hot blank zone 100 and the cold blank zone 200 of the 2 # slab library span 2 and the two ends of the heating furnace span 3, wherein the feeding roller way 40 has a structure for delivery in two directions.

Figure 4:
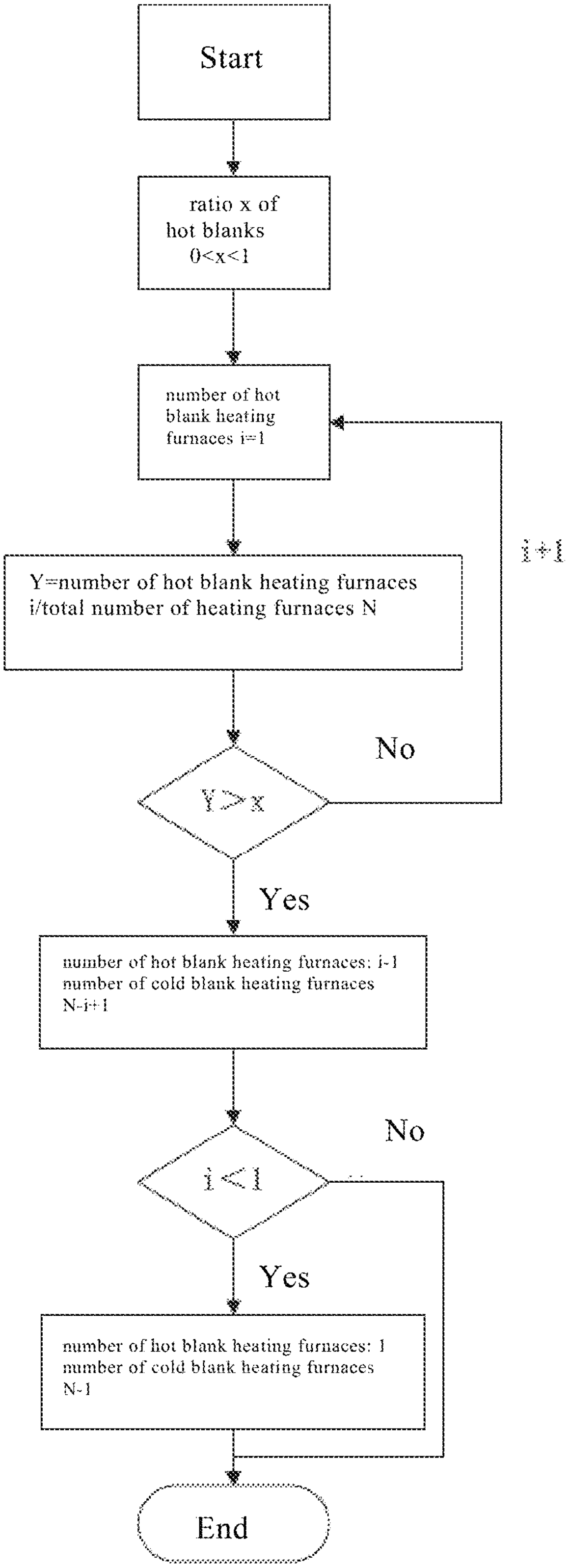
FIG. 4 is a flow chart of the furnace loading method according to the present invention.

Referring to FIG. 4, the furnace loading method using the slab library for separate storage of cold blanks and hot blanks of heavy plates and furnace layout according to the present invention comprises the following steps:

1) determining the ratio x of hot blanks in the blanks to be fed in a planned heating and rolling process;

2) according to the ratio of hot blanks and the number of the heating furnaces (the total number of the heating furnaces is N, the number of the selected hot blank heating furnaces is i, and the hot blank heating furnace ratio is $y=i/N$; setting the initial value of i as 1, and calculating the hot blank heating furnace ratio y, wherein if the value of y is greater than the ratio x, then $i-1$ of the heating furnaces are selected as the hot blank heating furnaces, and $N-i+1$ of the heating furnaces are selected as the cold blank heating furnaces; and if $i<1$, then the number of the hot blank heating furnace is 1, and the number of the cold blank heating furnaces is N−1; and 3) setting heating furnaces No. 1 to No. i−1 as a feeding roller zone for hot blanks, and heating furnaces No. N to No. N−i+1 as a feeding roller zone for cold blanks, feeding hot blanks from the roller way at the end of the 1st heating furnace, and feeding cold blanks from the roller way at the end of the Nth heating furnace.

Example 1

Figure 2:
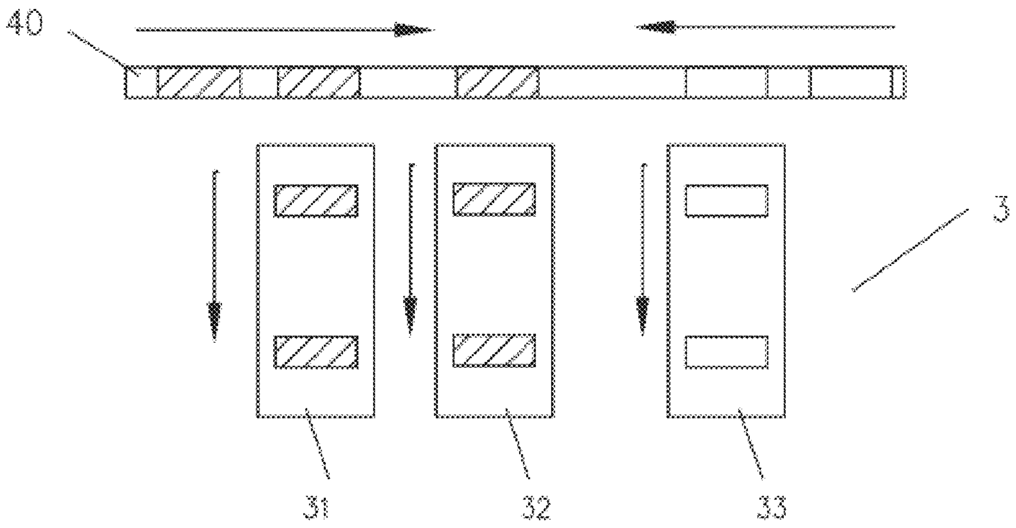
FIG. 2 is a schematic view of the inventive example 1.

Referring to FIG. 2, the total number of the heating furnaces N=3, and the ratio of hot blanks is 70%, wherein the number of hot blank heating furnaces is 2 (i.e. the heating furnaces 31, 32), and the number of cold blank heating furnaces is 1 (i.e. the heating furnace 33).

Example 2

Figure 3:
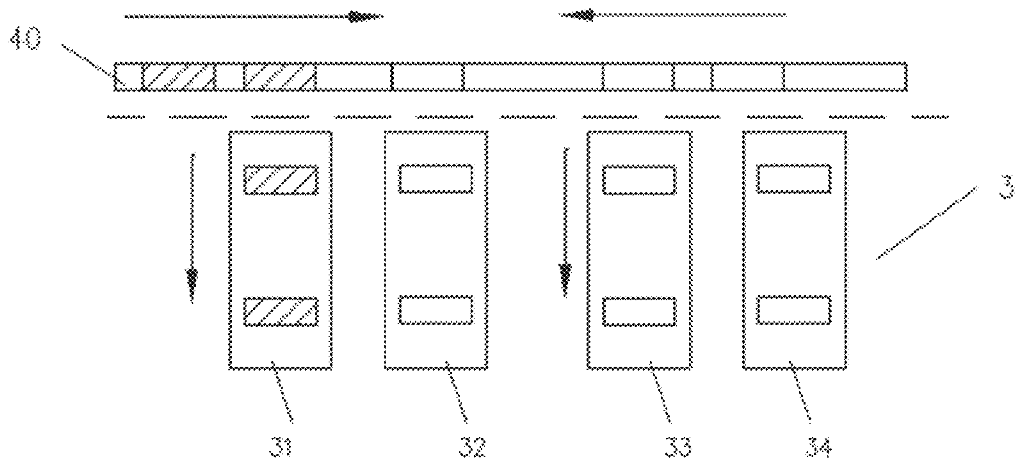
FIG. 3 is a schematic view of the inventive example 2.

Referring to FIG. 3, the total number of the heating furnaces N=4, and the ratio of hot blanks is 20%, wherein the number of hot blank heating furnaces is 1 (i.e. the heating furnace 31), and the number of cold blank heating furnaces is 3 (i.e. the heating furnaces 32, 33, 34).

Although the specific embodiments of the present invention have been described, those skilled in the art will understand that these are just illustrative, and the protection scope of the present invention is defined by the accompanying claims. Various changes or modifications to the invention can be made by those skilled in the art after reading the above teachings of the invention, and these equivalent variations fall in the scope defined by the accompanying claims of the application as well.

What is claimed is:

1. A slab library for separate storage of cold blanks and hot blanks of heavy plates and heating furnace layout, comprising:

1 # slab library span for storing the blanks which need to be stored for a long time, or cold blanks;

2 # slab library span, i.e. feeding span, arranged side by side on one side of the 1 # slab library span, for stacking hot blanks which need to be temporarily stacked for a short time (i.e. hot blanks to be fed), or for storing cold blanks to be fed, wherein a continuous casting blank delivery roller way connected to a continuous casting process is arranged at an inlet of the 2 # slab library span; and, a cold blank zone and a hot blank zone are respectively arranged within the 1 # slab library span and the 2 # slab library span;

heating a furnace span arranged at an outlet of the 2 # slab library span, wherein more than two heating furnaces are arranged in the heating furnace span, and arranged side by side at the outlet of the 2 # slab library span, wherein the heating furnaces are corresponding to the hot blank zone and the cold blank zone;

slab preparatory library span, which is across the inlets of the 1 # slab library span and the 2 # slab library span, i.e. a hot blank zone, wherein the continuous casting blank delivery roller way passes through the slab preparatory library span;

span-crossing traverse trolley roller way, which is across the cold blank zones of the 1 # slab library span and the 2 # slab library span, and the heating furnace span;

span-crossing roller way, which is across the slab preparatory library span and the 1 # slab library span, for delivering the blanks from the slab preparatory library span or the blanks from the continuous casting blank delivery roller way to the 1 # slab library span; and feeding roller way, arranged between the 2 # slab library span and the heating furnace span, and across the hot blank zone and the cold blank zone of the 2 # slab library span and the two ends of the heating furnace span, wherein the feeding roller way has a structure for delivery in two directions.

2. A furnace loading method using a slab library for separate storage of cold blanks and hot blanks of heavy plates and heating furnace layout, comprising the following steps:

1) determining the ratio x of hot blanks need to be fed in a planned heating and rolling process;

2) according to the ratio of hot blanks and the number of heating furnaces: the total number of the heating furnaces is N, the number of the selected hot blank heating furnaces is i, and the hot blank heating furnace ratio is y=i/N; setting the initial value of i as 1, and calculating the hot blank heating furnace ratio y, wherein if the value of y is greater than the ratio x, then i−1 of the heating furnaces are selected as the hot blank heating furnaces, and N−i+1 of the heating furnaces are selected as the cold blank heating furnaces; and if i<1, then the number of the hot blank heating furnace is 1, and the number of the cold blank heating furnaces is N−1; and 3) setting heating furnaces No. 1 to No. i−1 as a feeding roller zone for hot blanks, and heating furnaces No. N to No. N−i+1 as a feeding roller zone for cold blanks, feeding hot blanks from the roller way at the end of the 1st heating furnace, and feeding cold blanks from the roller way at the end of the Nth heating furnace.

3. The furnace loading method according to claim 2, wherein the total number of the heating furnaces N is 3, and the ratio of hot blanks is 70%, wherein the number of hot blank heating furnaces is 2, and the number of cold blank heating furnaces is 1.

4. The furnace loading method according to claim 2, wherein the total number of the heating furnaces N=4, and the ratio of hot blanks is 20%, wherein the number of hot blank heating furnaces is 1, and the number of cold blank heating furnaces is 3.

* * * * *